United States Patent
Jones et al.

(10) Patent No.: US 11,572,498 B2
(45) Date of Patent: Feb. 7, 2023

(54) THIXOTROPIC SEALING COMPOSITION AND INJECTION THEREOF FOR USE DURING DRILLING

(71) Applicant: HALLIBURTON ENERGY SERVICES, INC., Houston, TX (US)

(72) Inventors: Paul Joseph Jones, Houston, TX (US); Samuel J. Lewis, The Woodlands, TX (US); Thomas Jason Pisklak, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/982,005

(22) PCT Filed: Apr. 17, 2018

(86) PCT No.: PCT/US2018/028010
§ 371 (c)(1),
(2) Date: Sep. 17, 2020

(87) PCT Pub. No.: WO2019/203810
PCT Pub. Date: Oct. 24, 2019

(65) Prior Publication Data
US 2021/0017442 A1     Jan. 21, 2021

(51) Int. Cl.
  *E21B 21/00*    (2006.01)
  *C09K 8/512*    (2006.01)
  *C09K 8/24*     (2006.01)

(52) U.S. Cl.
  CPC ............... *C09K 8/512* (2013.01); *C09K 8/24* (2013.01); *E21B 21/003* (2013.01)

(58) Field of Classification Search
  None
  See application file for complete search history.

(56) References Cited

U.S. PATENT DOCUMENTS

| 4,458,528 A | * | 7/1984 | Roper ............... B01D 39/2068 |
| | | | 73/152.49 |
| 8,360,145 B2 | | 1/2013 | Kalman et al. |
| 9,206,345 B2 | | 12/2015 | Weaver et al. |
| 2010/0036017 A1 | | 2/2010 | Eoff et al. |
| 2011/0094746 A1 | | 4/2011 | Allison et al. |
| 2011/0114318 A1 | * | 5/2011 | Ezell ..................... C09K 8/512 |
| | | | 166/305.1 |
| 2011/0139454 A1 | | 6/2011 | Shindgikar et al. |
| 2013/0020083 A1 | * | 1/2013 | Wagie ..................... C09K 8/12 |
| | | | 166/305.1 |

(Continued)

FOREIGN PATENT DOCUMENTS

CN        106634878 A    5/2017

OTHER PUBLICATIONS

International Search Report, Response & Written Opinion, PCT Application No. PCT/US2018/028010, dated Feb. 25, 2019.
English Abstract of CN106634878 from www.espacenet.com.

*Primary Examiner* — Andrew Sue-Ako
(74) *Attorney, Agent, or Firm* — Polsinelli PC

(57) ABSTRACT

A thixotropic composition having a cross-linkable polymer, cross-linking agent, initiator and a thixotropic agent. The thixotropic agent may be a clay or a saccharide polymer. The thixotropic composition may be introduced into a drill string via a batch or on-the-fly process to prevent loss of drilling fluid into the surrounding formation.

20 Claims, 4 Drawing Sheets

(56) References Cited

U.S. PATENT DOCUMENTS

| | | | |
|---|---|---|---|
| 2014/0323361 A1* | 10/2014 | Livanec | C09K 8/035 |
| | | | 507/120 |
| 2015/0072397 A1* | 3/2015 | Tan | C09K 8/68 |
| | | | 435/189 |
| 2015/0072904 A1 | 3/2015 | D'Elia et al. | |
| 2016/0032169 A1* | 2/2016 | Chew | C09K 8/50 |
| | | | 175/57 |
| 2016/0177162 A1* | 6/2016 | Nguyen | C09K 8/602 |
| | | | 166/300 |
| 2016/0200848 A1* | 7/2016 | Su | C09K 8/44 |
| | | | 507/120 |
| 2017/0259457 A1* | 9/2017 | Chong | B28C 9/004 |

* cited by examiner

THIXOTROPIC SEALING COMPOSITION AND INJECTION THEREOF FOR USE DURING DRILLING

CROSS-REFERENCE TO RELATED APPLICATIONS

This application is a national stage entry of PCT/US2018/028010 filed Apr. 17, 2018, said application is expressly incorporated herein by reference in its entirety.

FIELD

The present disclosure relates to a composition for inhibiting the loss of drilling fluid into a subterranean formation during drilling.

BACKGROUND

In order to access subterranean hydrocarbons drilling is typically carried out deep within the earth. A drill is employed made up of a long tubular string having a drill bit at the end which is lowered in to the earth to form a wellbore. During drilling a drilling fluid is typically provided from the surface through the drill string and through the bottom portion of the drill, which typically exits the drill bit. The drilling fluid exiting the drill is typically used to remove undesirable components such as cuttings, which is the solid subterranean material cut by the drill, as well as lubricate components of the drill.

The drilling fluid is generally circulated back to the surface of the annulus between the drill string and the surface to the wellbore. Occasionally the drilling fluid may be lost to the surrounding formation for various reasons such as openings or cavities, also known as vugs, in the wellbore.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
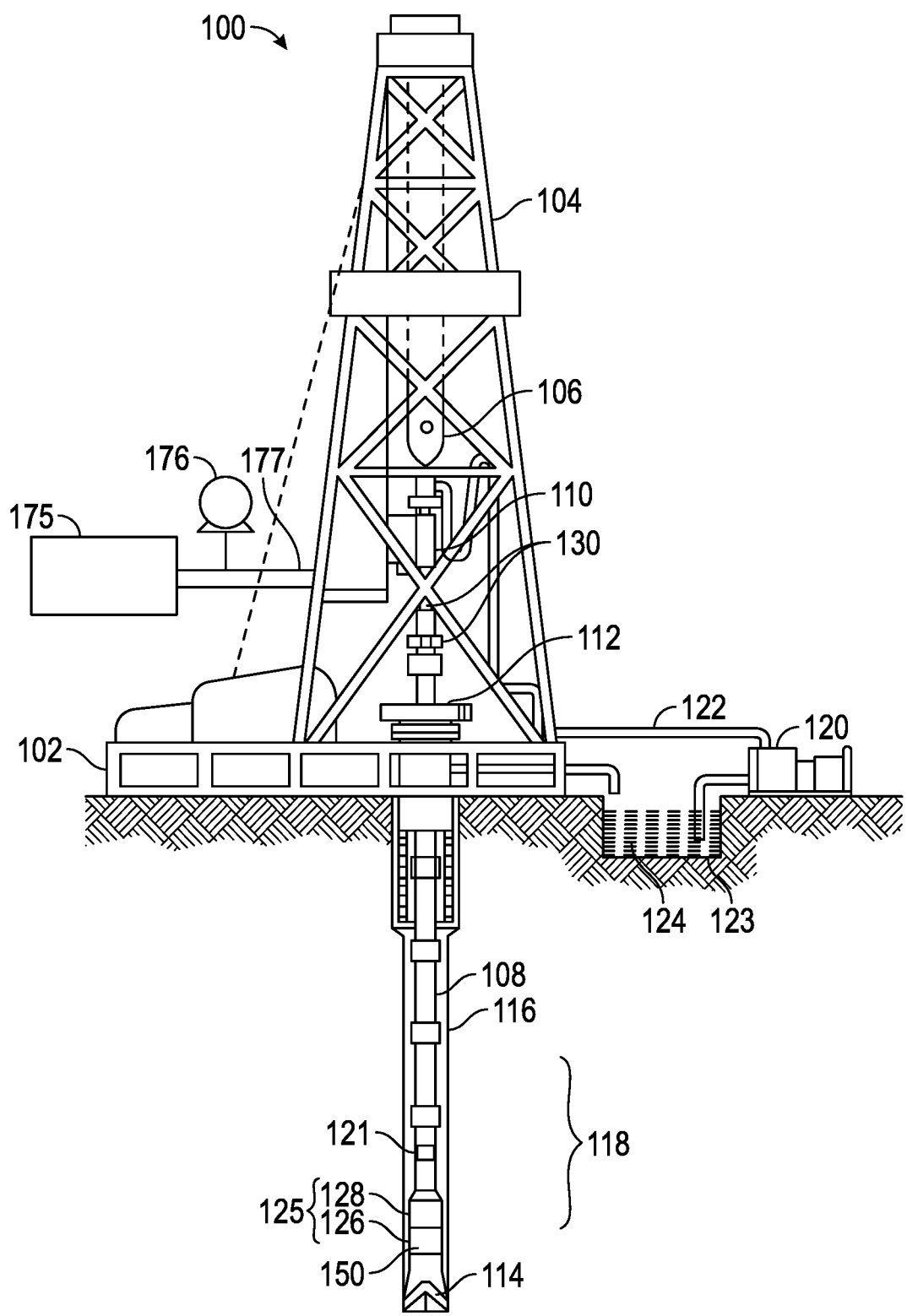
FIG. 1 illustrates a diagrammatic view of an example wellbore operating environment.

Various embodiments of the disclosure are discussed in detail below. While specific implementations are discussed, it should be understood that this is done for illustration purposes only. A person skilled in the relevant art will recognize that other components and configurations may be used without departing from the spirit and scope of the disclosure.

It should be understood at the outset that although illustrative implementations of one or more embodiments are illustrated below, the disclosed apparatus and methods may be implemented using any number of techniques. The disclosure should in no way be limited to the illustrative implementations, drawings, and techniques illustrated herein, but may be modified within the scope of the appended claims along with their full scope of equivalents.

Disclosed herein is a composition, method and system for preventing the loss of drilling fluid during drilling and well construction. The loss of fluid may occur as a result of a weak formation or the presence cracks, holes, cavities, VUGs and the like which may be present or occur during drilling. As a result of the loss of drilling fluid to the surrounding formation the hydrostatic pressure along the length of the borehole may substantially decrease. An underbalanced condition may result, wherein the formation pressure is larger than the hydrostatic pressure in the borehole, leading to unwanted flow from the formation. As the pressure decreases, larger amounts of drilling fluid are required in order to counteract the loss of fluid which may decrease efficiencies and raise costs.

Disclosed herein is a thixotropic fluid composition for inhibiting or preventing the loss of drilling fluid into the surrounding formation during drilling. The thixotropic composition may be pumped through the drill string and out into the borehole. The composition will accordingly exhibit non-Newtonian properties having low viscosity under shear, but then returning to a gel state in the absence of shear. The thixotropic properties permit the composition to be more easily pumped and handled, but once downhole prevent the composition from being lost to the formation allowing it to develop enough strength to support the column of fluid above it and eliminate losses.

The thixotropic fluid composition disclosed herein has an aqueous base fluid. A base polymer is provided, which may be in the form of a monomer and a prepolymer. An exemplary base polymer may be an acrylamide, and may be added to the system in the form of an acrylamide monomer and a polyacrylamide prepolymer. The term polymer herein encompasses both homopolymers and copolymers. The thixotropic composition also includes a cross-linking agent, such as a primary and secondary amine functionalized cross-linking agent. The base polymer and cross-linking agent together may be adjusted increase or decrease strength of the cross-linked polymer network. Optionally, a retarding agent may be added to delay the cross-linking. A weighting agent may also be added to control density of the composition. The composition also includes a thixotropic agent, also referred to herein as a viscosity controlling agent, which imparts thixotropic properties to the composition. The thixotropic agent may be inorganic, such as a clay, or may be organic such as saccharide polymers.

The addition of the thixotropic agent imparts thixotropy to the polymer based composition enabling hydrostatic control of the well above the pore pressure of the surrounding formation.

Further disclosed herein is a process for preparing and injecting the thixotropic composition into a wellbore. The thixotropic composition may increase viscosity if not kept under shear, and furthermore, the polymer, cross-linking agent and initiator may serve to gel or increase the viscosity of the composition prior to delivery to the desired location in the wellbore. The method may include on-the-fly processes as well as batch processes. The on-the-fly processes may include a prehydration of the thixotropic agent, with the polymer, cross-linkable polymer, cross-linker and initiator being added separately the prehydrated thixotropic to a mixer or a pump. The batch process may include a mixture of all the components of the thixotropic composition, such as, the thixotropic agent, cross-linkable polymer, cross-linker, initiator, weighting agent and base fluid, as well as other components, which are first mixed together and then injected via a pump into the drill string.

An exemplary drilling environment or implementation of the present disclosure is shown in FIG. 1. As depicted in FIG. 1, a drilling platform 102 is equipped with a derrick 104 that supports a hoist 106 for raising and lowering a drilling device 105 having a drill string 108 and a bottom hole assembly 125. The hoist 106 suspends a top drive 110 suitable for rotating the drill string 108 and lowering the drill string 108 through the well head 112. Connected to the lower end of the drill string 108 and as part of the bottom hole assembly 125 is a drill bit 114. As the drill bit 114 rotates, the drill bit 114 creates a wellbore 116 that passes through various formations 118. A pump 120 circulates drilling fluid 124 through a supply pipe 122 to top drive 110, down through the interior of drill string 108, through the bottom hole 125 and orifices in drill bit 114, back to the surface via the annulus around drill string 108, and into a retention pit 123. The drilling fluid transports cuttings from the wellbore 116 into the pit 123 and aids in maintaining the integrity of the wellbore 116. Various materials can be used for drilling fluid, including oil-based fluids and water-based fluids. The flow rates of the drilling fluid may depend on the size of the wellbore, and it may be desirable to employ the thixotropic composition herein when the drilling fluid begins to require high flow rates such as above 1,500 gallons per minute (gpm), alternatively above 2,000 gallons per minute (gpm). Alternatively it may be desirable to use the thixotropic composition herein under normal conditions and flow rates such as between 40 gpm to below 1,500 gpm, or from about 250 gpm to about 1,200 gpm.

As further depicted in FIG. 1, logging tools 126 for logging while drilling (LWD) and/or measurement while drilling (MWD) are integrated into the bottom hole assembly 125 near the drill bit 114. A bypass 121 may be included above the bottom hole assembly 125. As the drill bit 114 extends the wellbore 116 through the formations 118, logging tools 126 collect measurements relating to various formation properties as well as the orientation of the tool and various other drilling conditions. The bottom hole assembly 125 may also include a telemetry sub 128 to transfer measurement data to a surface receiver 130 and to receive commands from the surface. In some embodiments, the telemetry sub 128 communicates with a surface receiver 130 using mud pulse telemetry. In other cases, the telemetry sub 128 does not communicate with the surface, but rather stores logging data for later retrieval at the surface when the logging assembly is recovered. Notably, one or more of the bottom hole assembly 125, the logging tools 126, and the telemetry sub 128 may also operate using a non-conductive cable (e.g. slickline, etc.) with a local power supply, such as batteries and the like. When employing non-conductive cable, communication may be supported using, for example, wireless protocols (e.g. EM, acoustic, etc.) and/or measurements and logging data may be stored in local memory for subsequent retrieval at the surface, as is appreciated by those skilled in the art.

Each of the logging tools 126 may include a plurality of tool components, spaced apart from each other, and communicatively coupled with one or more wires. Logging tools 126 may include tools such as the one shown in FIG. 1 in order to perform various types of logging. The telemetry sub 128 may include wireless telemetry or logging capabilities, or both, such as to transmit or later provide information indicative of received acoustic energy/waveforms to operators on the surface or for later access and data processing for the evaluation of formation 118 properties. The logging tools 126, including the acoustic logging tool, may also include one or more computing devices 150 communicatively coupled with one or more of the plurality of tool components. The computing device 150 may be configured to control or monitor the performance of the tools 126, process logging data, and/or carry out the methods of the present disclosure.

As further depicted, a container 175 is provided which may contain the thixotropic composition disclosed herein. The thixotropic composition may be made batchwise or on the fly. In a batch process, the components may be added to container 175 where it is mixed on site, or made off-site and delivered. The cross-linkable polymer and cross-linking agent may be kept separate until it is intended to use the thixotropic composition and then mixed along with the retarding agent. In process, the thixotropic agent, such as clay, may be added to the container 175 along with water, so as to prehydrate the clay. The cross-linkable polymer may then be added to the container 175. In batch mixing, the cross-linking agent is added just prior to pumping into the drill string. In mixing on the fly, the cross-linking agent is dissolved in water and added using a liquid additive mixing system to the thixotropic agent (such as a prehydrated clay) and cross-linkable polymer. The retarding agent may also be added to delay or inhibit cross-linking or polymerization.

The thixotropic composition in container 175 may include mixing equipment as well as pump 176 so as to pump the thixotropic composition via hose 177 into the drill string 108 of the drilling device 105. While a tubular hose 177 is depicted, any tubular channel may be used including piping. The pump 176 may be an HT-400™ pump sold by Halliburton Energy Services, Inc. The container 175 may be a batch mixer, slug pit, tote, or other structure for holding material. The thixotropic composition may be pumped along with the drilling fluid 124, or as a pill. A pill may be understood as a quantity of fluid forming an interval between columns of the drilling fluid 124. The thixotropic composition may be pumped during drilling, or the drilling may be temporarily interrupted (stopped) and then injected, and then drilling continued. Although shown herein the thixotropic composition is introduced into a drilling device, it may be introduced and used with any tubular for any process or phase of a wellbore.

The temperature downhole for employment of the thixotropic composition may range anywhere from about 20° F. to about 500° F., alternatively from about 32° F. to about 400° F.

Figure 2A:
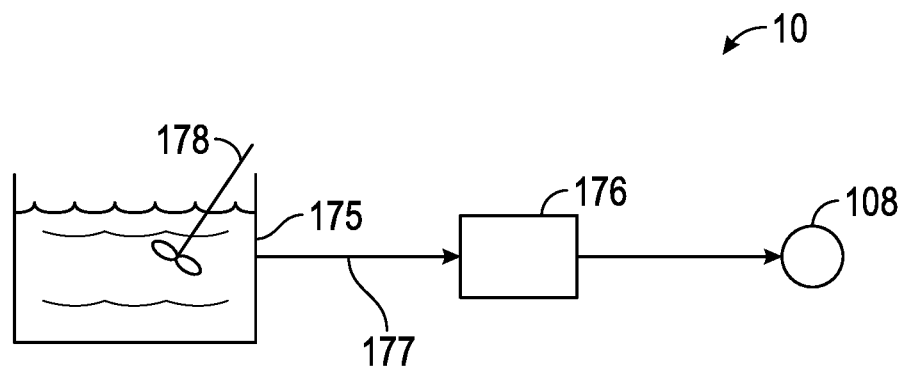
FIG. 2A illustrates a diagrammatic view of an exemplary batch process for delivery of the thixotropic composition disclosed herein.

FIG. 2A depicts a schematic flow diagram of a batch process 10 for delivering the thixotropic composition as disclosed herein. The components of the thixotropic composition, such as, the thixotropic agent, cross-linkable polymer, cross-linker, initiator, weighting agent, retarding agent, and base fluid, as well as other components may be mixed in a container 175 and mixed via an impeller 178. Any mixing or perturbation device other than an impeller 178 may be used. The thixotropic composition from container 175 via hose 177 (or other conduit) through pump 176 into the drill string 108 and out bottom. The pump 176 may be any suitable pump for injecting the thixotropic composition, and may be an HT-400™ pump sold by Halliburton Energy Services, Inc. In addition to the shear provided by the impellors on the mixing tank, recirculation pumps or centrifugal pumps can aid in homogenizing the treatment fluid. Using this technique the treatment fluid may be easily sampled and checked for quality.

Figure 2B:
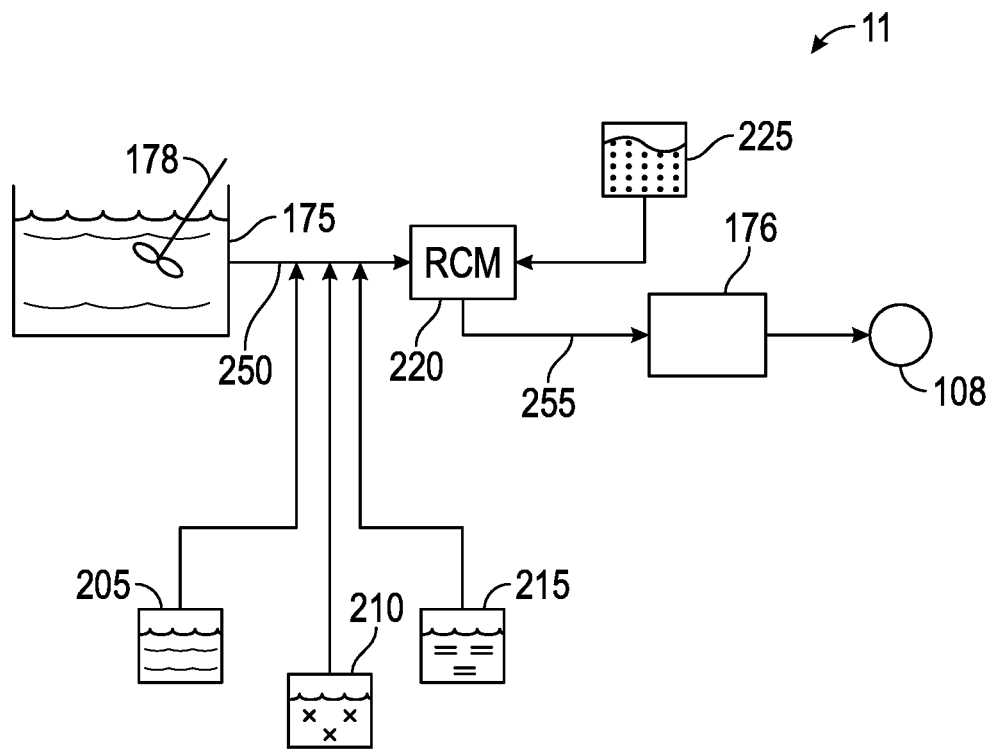
FIG. 2B illustrates a diagrammatic view of an exemplary on-the-fly process for delivery of the thixotropic composition disclosed herein.

On-the-fly processes are continuous processes which may be used alternatively to the batch process. On-the-fly processes may assist in avoiding areas of gelation which may occur in areas of low shear in the batch process. The jetting action of the fluids into a recirculating cement mixer (RCM) and recirculation action while in the RCM may allow a weighting agent to be homogenized. FIG. 2B depicts a schematic flow diagram of an on-the-fly process 11. It is generally not limited by the volume of a mixing container and can be used to mix an essentially unlimited amount of treatment fluid. Container 175 may contain a thixotropic agent in an aqueous base fluid, so as to form a prehydrate thixotropic agent. The container 175 may be a batch mixer with impeller 178 for mixing the thixoptropic agent. The prehydrate thixotropic agent along line 250 may be pumped to recirculating mixer 220. Other components of the thixotropic composition disclosed herein may be added to line 250 (or other conduit), as illustrated by the arrows in FIG. 2B, or to mixer 220, from cross-linkable polymer source 205, cross-linker source 210, and initiator source 215, each of which may be contained in containers. A weighting agent source 225 may be provided to the recirculating mixer 220. The thixotropic composition in the recirculating mixer 220 may be provided via line 255 (or other conduit) to pump 176, and then injected through the drill string 108. Lines 250 and 255 may be hoses or pipes or other channel for carrying fluid.

Figure 2C:
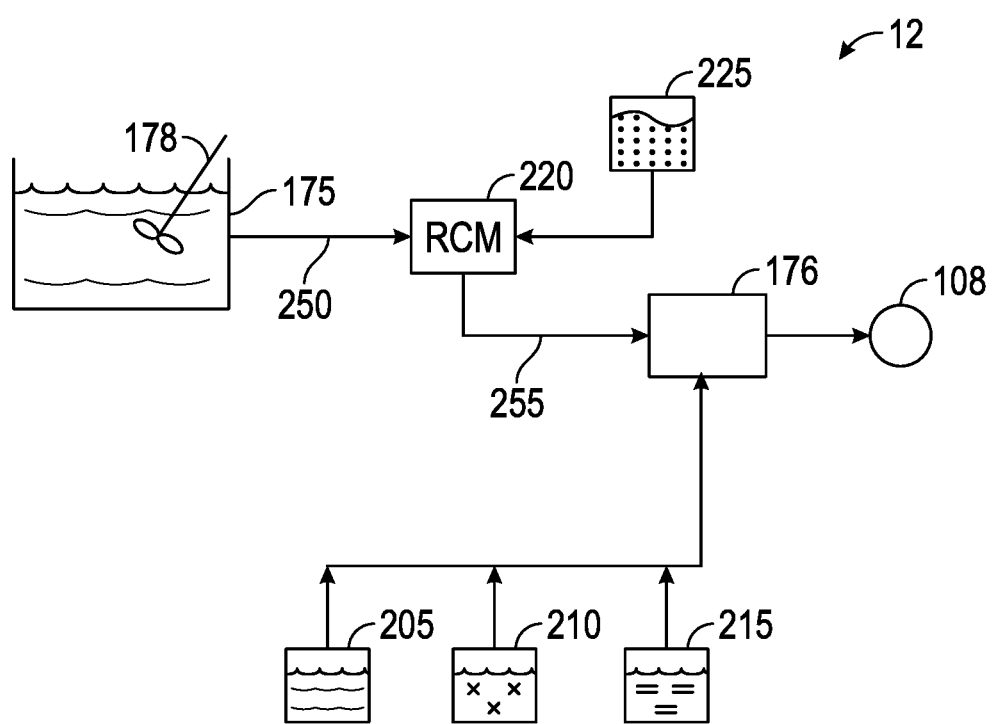
FIG. 2C illustrates a diagrammatic view of exemplary on-the-fly process for delivery of the thixotropic composition disclosed herein.

FIG. 2C depicts a schematic flow diagram of an on-the-fly process 12. The mixing process described in FIG. 2C is a modification to the process outlined in FIG. 2B. This may be implemented for instance, when the treatment fluid may be difficult to mix. In this process the prepolymer, crosslinker and initiator may be injected directly into the suction header of a pump (such as a triplex pump). Container 175 may contain a thixotropic agent in an aqueous base fluid, so as to form a prehydrate thixotropic agent. In this process 12, the prehydrate thixotropic agent is sent via line 250 to recirculating mixer 220. A weighting agent source 225 may be provided to the recirculating mixer 220. The prehydrate thixotropic agent with the weighting agent may then be pumped via line 255 to pump 176. Other components of the thixotropic composition disclosed herein may be added to the pump simultaneously, from cross-linkable polymer source 205, cross-linker source 210, and initiator source 215. The thixotropic composition is then pumped by pump 176 to the drill string 108. A combination of the on-the-fly processes 11 and 12 may be employed where the cross-linkable polymer source 205, cross-linker source 210, and initiator source 215 are added to both line 250 and/or recirculation mixer 220, and/or pump 176.

Figure 3:
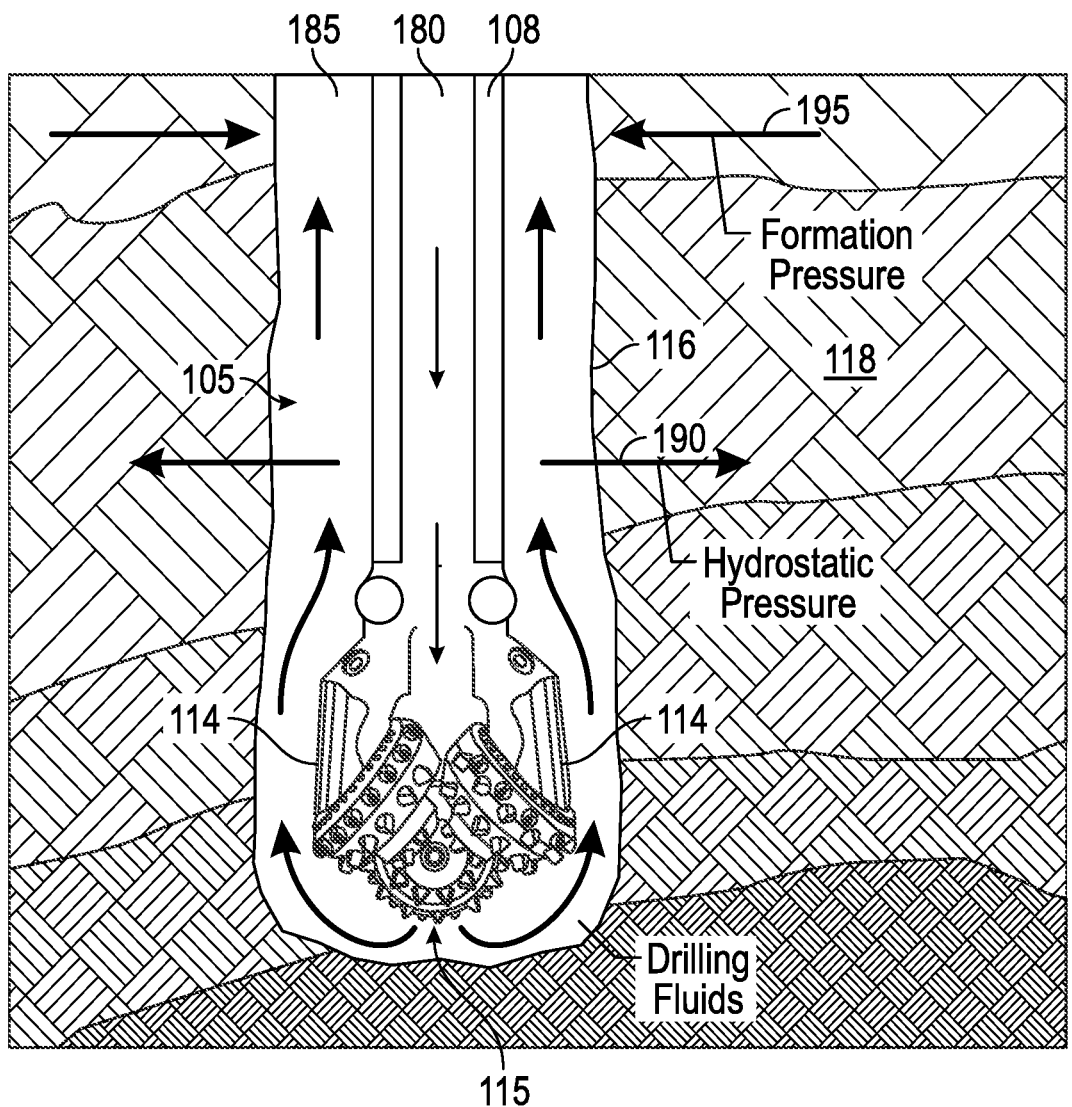
FIG. 3 illustrates a diagrammatic view of a fluid exiting the lower portion of a drilling device in a wellbore.

As illustrated in FIG. 3 illustrates the lower portion of the drilling device 105 is provided. As shown, the drilling device 105 has an internal bore 180 in which the drilling fluid may flow. The flow of the drilling fluid is illustrated by the arrow. The drilling fluid flows through the internal bore 180 from and flows out (flowing may include ejecting) of exit 115 in the drill bit 114, and up through the annulus 185 between the drilling string 108 and surface of the wellbore 116. While the exit 115 is shown herein through the drill bit 114, the fluid can be made to exit anywhere along the drill string 108. For instance, additionally, or in the alternative, the bypass 121 (shown in FIG. 1) may serve as an exit. The wellbore 116 furthermore has a hydrostatic pressure 190 exerted outward into the formation, indicated by the arrow. Furthermore, the formation has a formation pressure 195 exerted toward the wellbore 116. It is generally desirable to keep the hydrostatic pressure 190 in the wellbore 116 higher than the formation pressure 195. When drilling fluid is lost to the formations 118, the hydrostatic pressure may decrease at one or more locations along the length of the wellbore 116 causing greater amounts of drilling fluid to be pumped, and may cause an underbalanced condition to occur. The thixotropic composition herein is pumped through the internal bore 180 and out the exit 115, wherein it forms a gel and avoids loss of the thixotropic composition and drilling fluid to the formations 118. After placement in the borehole, the gel strength may immediately develop once the pumping has ceased, as imposed shear also ceases, due to the network formation of the thixotropic agent.

Cross-Linkable Polymer

The thixotropic fluid composition herein includes a polymeric base, formed from a water soluble cross-linkable polymer and cross-linking agent. The polymer may form a gel as it is cross-linked and having strength adjustable according to the degree of cross-linking. Cross-linkable polymers disclosed herein may include water soluble polymers which may be amine or amide based polymers, polyacrylamides, partially hydrolyzed polyacrylamides, partially hydrolyzed polymethacrylamides, polymethacrylamides, acrylic acid-acrylamide copolymers, acrylic acid-methacrylamide copolymers, poly(acrylamide-co-acrylate ester), polyvinyl alcohol, polyalkyleneoxides. The cross-linkable polymer may be added as a polymer, or may be added in in the form of a monomer or prepolymer for polymerization. The acrylamide polymers herein may be formed for instance using a monomer and prepolymer composition such as an acrylamide monomer with a polyacrylamide prepolymer.

Additional suitable water soluble cross-linkable polymers include polyvinyl pyrrolidone AMPS®(2-acrylamido-2-methylpropane sulfonic acid)/acrylamide copolymers, sulfonated styrene/maleic anhydride copolymers, vinylpyrrolidone/AMPS®/acrylamide terpolymers, AMPS®/N—N-dimethylacrylamide/acrylamide terpolymers, polyketones and oxidized polyvinyl alcohol. The cross-linkable polymers which are used in the present disclosure can themselves be biodegradable and/or non-toxic. Examples of such polymers include alginic acid derivatives, oxidized polyvinyl alcohol and low molecular weight acrylic polymers.

The cross-linkable polymer may be present in the thixotropic composition from about 0.5% to about 70% by weight, alternatively from about 5% to about 50%, alternatively from about 10 to about 30%, encompassing any value and subset therebetween.

The cross-linking agent may be selected based on the chosen cross-linkable polymer so that proper cross-linking may occur. Exemplary cross-linking agents include for instance a primary or secondary functionalized amine, including for instance polyalkyleneimines and polyalkylenepolyamines. Additionally chitosan polymers have been used as a cross-lining agent. The weight ratio of cross-linkable polymer to cross-linking agent is from about 50:1 to about 1:1, alternatively from about 40:1 to about 5:1, alternatively from about 30:1 to about 10:1, encompassing any value and subset therebetween.

An exemplary cross-linking system may include for instance a poly(acrylamide-co-acrylate ester) copolymer with a polyethyleneimine cross-linking agent. An exemplary cross-linking system may be H2Zero™ service by Halliburton Energy Services, Inc. These may be commercially available as HZ-10™ polymer (a poly(acrylamide-co-acrylate ester)) and HZ-20™ (polyethyleneimine cross-linking agent) from Halliburton Energy Services, Inc.

Initiators may also be employed to initiate polymerization of the base cross-linkable polymer when it includes a monomer or prepolymer or other polymerizable polymer. Initiators include for instance azo, peroxide and hyperoxides. Azo initiators include 2,2'-Azobis(2-methylpropionitrile, 2,2'-azobis(isobutyronitrile), 2,2'-azobis(2-amidinopropane)dihydrochloride, 4,4'-azobis(4'-cyanopentanoic acid), 2,2'-Azobis[2-methyl-N-(2-hydroxethyl)propionamide and the like. Suitable peroxides include peroxides such as hydrogen peroxide and tertiary-butyl hydroperoxide.

In order to delay cross-linking a retarding agent may be added to the composition. The regarding agent may slow or inhibit the cross-linking reaction until the thixotropic composition has reached a desired location in the drill string or exited the drilling device or otherwise entered the wellbore. The retarding agent may adjust the pH either higher or lower to slow polymerization or cross-linking. The regarding agent may be selected based on the particular cross-linkable polymer and cross-linking agent employed. An exemplary regarding agent may include buffering agents suitable for use in this disclosure include carbonates, potassium carbonate, sodium carbonate, calcium carbonate, bicarbonates, sodium bicarbonate, potassium bicarbonate, phosphates, monosodium phosphate, disodium phosphate, monopotassium phosphate, dipotassium phosphate, ammonium phosphate, diammonium phosphate, citric acid, citrates, acetic acid, magnesium oxide, acetates, borates, or combinations thereof.

An exemplary commercially available retarding agent is K35™ buffering agent from Halliburton Energy Services, Inc. which is a solid carbonate, and is a finely divided, moderately alkaline white powder, and provides buffering action for some base gels and raises their pH.

Thixotropic Agent

The thixotropic composition herein also includes a thixotropic agent which imparts thixotropic properties to the composition. The thixotropic agent acts as a viscosity controlling agent and causes the thixotropic composition to exhibit shear thinning properties in the presence of shear. Under shear stress the composition will decrease in viscosity and will flow, whereas under static conditions the thixotropic composition will have higher viscosity and may be a gel and thicken.

The thixotropic agent may be inorganic or a mineral based solid, such as a clay. Such clays may be natural or synthetic, and may be a layered silicate clay, and may include layers of silica and/or alumina. The clay may be a phyllosilicate, and may include various elements such as aluminum magnesium, or alkali or alkaline earth metals, which may be in oxide form such as silicon dioxide, magnesium oxide, sodium oxide, and may be hydrated. The clays may include smectites or montmorillonite. Exemplary non-limiting clays suitable as thixotropic agents for the thixotropic composition herein may include kaolinite, bentonite and hectorite, sepiolite, illite and laponite. The clays may be hydrophilic, which are well suited to provide thixotropic behavior to the composition. In process, the clay may be pre-hydrated in the aqueous base fluid before the addition of the polymer (monomer and prepolymer).

Alternatively or additionally organic thixotropic agents may be employed. Such thixotropic agents may include for instance polysaccharides. Exemplary polysaccharides include bacterial and plant based gums, for example, galactomannans, welan, scleroglucan, xanthan, nonpyruvylated xanthan, guar, diutan, gellan, gum tragacanth, pestan, carboxymethylcellulose, hydroxyethylcellulose, hydroxymethylcellulos, hydroxypropylcellulose, hydroxypropyl guar (HPG), carboxymethylhydroxypropyl guar (CMHPG) and carboxymethyl guar (CMG), hydrophobically modified guars, guar and guar-containing compounds.

The thixotropic agent may be included from about 0.5% to about 70% by weight, alternatively from about 5% to about 50%, alternatively from about 10 to about 30%, encompassing any value and subset therebetween.

In addition to the above, the thixotropic composition may include a weighting agent. The weighting agent is a dense inert material added to control the density of the composition. The weighting agent may be selected from alkaline earth metal sulfates, barium sulfate (barite), calcium carbonate, dolomite, ilmenite, hematite, olivine, siderite, manganese oxide, silicon oxide, strontium sulphate, magnesium carbonate, iron carbonate, zinc carbonate, and manganese tetraoxide. The weighting agent may be sized so as to have a particle size distribution such that at least 90% by volume of the measured particle diameter is below 250 μm, or alternatively between about 1 μm about 75 μm, and may have a monomodal, bimodal or multimodal distribution. The density of the fluid may be adjusted to be from about 9 lbm/gal to about 16 lbm/gal, and may have a density of about 10 lbm/gal.

The thixotropic composition herein may include an aqueous base fluid which can serve as a phase in which components are dissolved, dispersed, or suspended. The fluid may include water, saltwater, seawater, brine, freshwater, and the like.

Numerous examples are provided herein to enhance understanding of the present disclosure. A specific set of statements are provided as follows.

Statement 1: A method comprising: introducing into a tubular drill string disposed within a wellbore, a thixotropic composition comprising: an aqueous base fluid, a cross-linkable polymer, a cross-linking agent for the cross-linkable polymer, a retarding agent, a weighting agent, an initiator, and a thixotropic agent imparting thixotropic properties to the composition; flowing the thixotropic composition out of an exit of the downhole drilling device into the wellbore; and continuing drilling with the downhole drilling device.

Statement 2: A method according to statement 1, wherein the thixotropic composition is introduced via an on-the-fly continuous process, the on-the-fly continuous process comprising: mixing the thixotropic agent with the aqueous base fluid to form a prehydrated thixotropic agent; and adding at least the cross-linkable polymer, cross-linking agent and initiator to the prehydrated thixotropic agent.

Statement 3: A method according to statement 1 or 2, wherein the cross-linkable polymer, cross-linking agent and initiator is added to the prehydrated thixotropic agent at or before a recirculating mixer.

Statement 4: A method according to any one of the preceding statements 1-3, wherein the cross-linkable polymer, cross-linking agent and initiator to the prehydrated thixotropic agent is added to the prehydrated thixotropic agent at the pump.

Statement 5: A method according to statement 1, wherein the thixotropic composition is mixed via a batch process prior to introducing into a tubular string.

Statement 6: A method according to any one of the preceding statements 1-5, wherein the drilling device has a bottom hole assembly having a drill bit, and the exit of the downhole drilling device is located along the bottom hole assembly.

Statement 7: The method according to any one of the preceding statements 1-6, wherein the exit is located on the drill bit.

Statement 8: The method according to any of the preceding statements 1-6, wherein the drilling device has a bottom hole assembly having a drill bit, and the exit of the downhole drilling device is located above the bottom hole assembly.

Statement 9: The method according to any one of the preceding statements 1-8, wherein the thixotropic composition forms a gel within the wellbore inhibiting the loss of drilling fluid.

Statement 10: The method according to any one of the preceding statements 1-9, wherein the cross-linkable polymer is a polyacrylamide.

Statement 11: The method according to any one of the preceding statements 1-10, wherein the cross-linking agent is one or more of a primary or secondary functionalized amine.

Statement 12: The method according to any one of the preceding statements 1-11, wherein the thixotropic agent is a clay.

Statement 13: A system comprising: a downhole drilling device disposed in a wellbore, the downhole drilling device having a tubular drill string and a bottom hole assembly; a thixotropic composition pumpable into the tubular drill string, the thixotropic composition comprising: an aqueous base fluid, a cross-linkable polymer, a cross-linking agent for the cross-linkable polymer, a retarding agent, a weighting agent, an initiator, and a thixotropic agent imparting thixotropic properties to the composition, the thixotropic composition flowable out of an exit of the downhole drilling device into the wellbore.

Statement 14: A system according to statement 13, wherein the thixotropic composition is pumped via an on-the-fly continuous process, the on-the-fly continuous process comprising mixing the thixotropic agent with the aqueous base fluid to form a prehydrated thixotropic agent, adding at least the cross-linkable polymer, cross-linking agent and initiator to the prehydrated thixotropic agent.

Statement 15: A system according to statement 13 or 14, wherein the cross-linkable polymer, cross-linking agent and initiator is added to the prehydrated thixotropic agent at or before a recirculating mixer.

Statement 16: The system according to any one of the preceding statements 13-15, wherein the cross-linkable polymer, cross-linking agent and initiator to the prehydrated thixotropic agent is added to the prehydrated thixotropic agent at the pump.

Statement 17: The method according to any one of the preceding statements 13-16, wherein the drilling device has a bottom hole assembly having a drill bit, and the exit of the downhole drilling device is located along the bottom hole assembly.

Statement 18: The system according to any one of the preceding statements 13-17, wherein the exit is located on the drill bit.

Statement 19: The system according to any one of the preceding statements 13-18, wherein the drilling device has a bottom hole assembly having a drill bit, and the exit of the downhole drilling device is located above the bottom hole assembly.

Statement 20: The system according to any one of the preceding statements 13-19, wherein the thixotropic composition forms a gel within the wellbore inhibiting the loss of drilling fluid.

Statement 21: The system according to any one of the preceding statements 13-20, wherein the thixotropic agent is a clay.

Statement 22: The system according to any one of the preceding statements 13-21, wherein the cross-linkable polymer is acrylamide monomer or polyacrylamide.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. Rather, the described features and steps are disclosed as possible components of systems and methods within the scope of the appended claims.

The invention claimed is:

1. A method comprising:
introducing into a tubular drill string disposed within a wellbore, a thixotropic composition comprising:
an aqueous base fluid,
a water soluble cross-linkable polymer in the form of a monomer and a prepolymer which is selected from a group consisting of amine or amide-based polymers, polyacrylamides, partially hydrolyzed polyacrylamides, partially hydrolyzed polymethacrylamides, polymethacrylamides, poly(acrylamide-co-acrylate ester), polyvinyl alcohol, and polyalkyleneoxides and comprises from about 12% to 70% by weight of the thixotropic composition,
a cross-linking agent for the cross-linkable polymer,
a retarding agent,
a weighting agent,
an initiator, and
a thixotropic agent imparting thixotropic properties to the composition;
flowing the thixotropic composition out of an exit of the downhole drilling device into the wellbore; and
continuing drilling with the downhole drilling device.

2. A method of claim 1, wherein the thixotropic composition is introduced via an on-the-fly continuous process, the on-the-fly continuous process comprising:
mixing the thixotropic agent with the aqueous base fluid to form a prehydrated thixotropic agent; and
adding at least the water soluble cross-linkable polymer, cross-linking agent and initiator to the prehydrated thixotropic agent.

3. A method of claim 2, wherein the water soluble cross-linkable polymer, cross-linking agent and initiator is added to the prehydrated thixotropic agent at or before a recirculating mixer.

4. A method of claim 2, wherein the water soluble cross-linkable polymer, cross-linking agent and initiator is added to the prehydrated thixotropic agent at a pump.

5. A method of claim 2, wherein the thixotropic composition is mixed via a batch process prior to introducing into a tubular string.

6. A method of claim 1, wherein the drilling device has a bottom hole assembly having a drill bit, and the exit of the downhole drilling device is located along the bottom hole assembly.

7. The method of claim 6, wherein the exit is located on the drill bit.

8. The method of claim 1, wherein the drilling device has a bottom hole assembly having a drill bit, and the exit of the downhole drilling device is located above the bottom hole assembly.

9. The method of claim 1, wherein the thixotropic composition forms a gel within the wellbore, thereby inhibiting loss of drilling fluid.

10. The method of claim 1, wherein the cross-linking agent is one or more of a primary or secondary functionalized amine.

11. The method of claim 1, wherein the thixotropic agent is a clay.

12. A system comprising:
a downhole drilling device disposed in a wellbore, the downhole drilling device having a tubular drill string and a bottom hole assembly;
a thixotropic composition pumpable into the tubular drill string, the thixotropic composition comprising:
an aqueous base fluid,
a water soluble cross-linkable polymer in the form of a monomer and a prepolymer which is selected from a group consisting of amine or amide based polymers, polyacrylamides, partially hydrolyzed polyacrylamides, partially hydrolyzed polymethacrylamides, polymethacrylamides, poly(acrylamide-co-acrylate ester), polyvinyl alcohol, and polyalkyleneoxides and comprises from about 12% to 70% by weight of the thixotropic composition,
a cross-linking agent for the cross-linkable polymer,
a retarding agent,
a weighting agent,
an initiator, and
a thixotropic agent imparting thixotropic properties to the composition;
the thixotropic composition flowable out of an exit of the downhole drilling device into the wellbore.

13. A system of claim 12, wherein the system is configured to pump the thixotropic composition via an on-the-fly continuous process, the on-the-fly continuous process comprising
mixing the thixotropic agent with the aqueous base fluid to form a prehydrated thixotropic agent,
adding at least the water soluble cross-linkable polymer, cross-linking agent, and initiator to the prehydrated thixotropic agent.

14. A system of claim 13, wherein the water soluble cross-linkable polymer, cross-linking agent and initiator is added to the prehydrated thixotropic agent at or before a recirculating mixer.

15. The system of claim 13, wherein the water soluble cross-linkable polymer, cross-linking agent, and initiator to the prehydrated thixotropic agent is added to the prehydrated thixotropic agent at the pump.

16. The system of claim 12, wherein the drilling device has a bottom hole assembly having a drill bit, and the exit of the downhole drilling device is located along the bottom hole assembly.

17. The system of claim 16, wherein the exit is located on the drill bit.

18. The system of claim 12, wherein the drilling device has a bottom hole assembly having a drill bit, and the exit of the downhole drilling device is located above the bottom hole assembly.

19. The system of claim 12, wherein the thixotropic composition forms a gel within the wellbore, thereby inhibiting loss of drilling fluid.

20. The system of claim 12, wherein the thixotropic agent is a clay.

* * * * *